United States Patent [19]

Wheeler et al.

[11] 4,278,601
[45] Jul. 14, 1981

[54] PROCESS FOR CONDITIONING PHTHALOCYANINE PIGMENT

[75] Inventors: Ian R. Wheeler, Craigend; George H. Robertson, Paisley; David McGregor, Glasgow, all of Scotland

[73] Assignee: Ciba-Geigy Corporation, Ardsley, N.Y.

[21] Appl. No.: 93,488

[22] Filed: Nov. 13, 1979

Related U.S. Application Data

[63] Continuation of Ser. No. 18,379, Mar. 7, 1979, abandoned, which is a continuation of Ser. No. 882,682, Mar. 2, 1978, abandoned.

[30] Foreign Application Priority Data

Mar. 19, 1977 [GB] United Kingdom ............... 11727/77

[51] Int. Cl.$^3$ ............................................. C09B 47/04
[52] U.S. Cl. .................................... 260/314.5; 106/23; 106/288 Q
[58] Field of Search ................... 260/314.5; 106/288 Q

[56] References Cited

U.S. PATENT DOCUMENTS

| | | | |
|---|---|---|---|
| 3,764,360 | 10/1973 | Langley | 106/288 Q |
| 3,891,455 | 6/1975 | Langley et al. | 106/288 Q |
| 4,055,440 | 10/1977 | Wheeler et al. | 260/314.5 X |
| 4,135,944 | 1/1979 | Wheeler | 260/314.5 X |
| 4,141,904 | 2/1979 | Cabut et al. | 260/314.5 |

*Primary Examiner*—John D. Randolph
*Attorney, Agent, or Firm*—Harry Falber

[57] ABSTRACT

A process for conditioning pigments which comprises grinding a crude copper phthalocyanine pigment and a crystallizing solvent in the absence of inorganic salt but in the presence of one or more sulphonated phthalocyanine amine derivative having the general formula

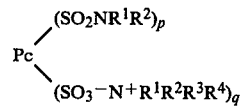

wherein Pc is a phthalocyanine, $R^1$, $R^3$ and $R^4$ are hydrogen or a hydrocarbon residue, $R^2$ is a hydrocarbon residue, p is 0 to 3, q is 1 to 4, and the sum of p and q is 1 to 4, the resulting pigment composition is freely dischargeable from the mill in high yield and is, moreover largely in the $\beta$-form.

10 Claims, No Drawings

PROCESS FOR CONDITIONING PHTHALOCYANINE PIGMENT

This is a continuation of application Ser. No. 018,379, filed on Mar. 7, 1979, now abandoned, which is a continuation of application Ser. No. 882,682, filed Mar. 2, 1978, which is now abandoned.

The present invention relates to a process for conditioning pigments and in particular to a process for the grinding of crude copper phthalocyanine pigments in the presence of sulphonated phthalocyanine-amine derivatives.

It is known that crude copper phthalocyanine because of its large crystal size is unsuitable for use as a pigment and requires treatment such as high energy grinding to produce pigmentary sized material. It is further known that such grinding of the β form crude copper phthalocyanine in, for example, a ball mill gives rise to a mixture of α and β forms. Such a mixture is inconvenient for use as a pigment in organic solvent containing application systems because of its tendency to change shade due to the conversion of the α-form to the stable β-form by the action of such organic solvents. The rate of this shade change will vary with solvent polarity, temperature and dispersing resins present.

The proportion of the α-form present in the mixture may be reduced, and hence the proportion of the stable β-form increased, by grinding crude phthalocyanine in the presence of small amounts of so-called crystallising solvents, which are organic solvents capable of converting to the β-form the α-form phthalocyanine generated during grinding as described for example in "Phthalocyanine Compounds" by Moser and Thomas, Reinhold, 1963, pp 159–161. Although this crystallising solvent may be used in large amounts on pigment such that a viscous dough or fluid dispersion is obtained the amount of such solvent used here lead to expensive removal and isolation processes. It is advantageous to utilise a small percentage of solvent and produce a dry powder product suitable for incorporation into any application medium.

Unfortunately even a small percentage of such crystallising solvents causes 'caking' of the mill charge. By 'caking' we mean the tendency of the mill charge to adhere to the grinding media and the sides of the mill, thereby reducing the efficiency of milling, and leading to a poor mill yield.

To overcome the problem of 'caking', the addition of inorganic salts as grinding aids is widely practised. Although effective in improving milling efficiency and mill yield the use of salts has several disadvantages, viz. the throughput of phthalocyanine is drastically reduced since up to 3 parts salt per part of phthalocyanine are required; the grinding cost per unit weight of phthalocyanine is substantially raised; the amount of crystallising solvent required to maintain the β form is increased and moreover the salt must be separated from the ground phthalocyanine pigment by an aqueous washing stage.

We have now found, surprisingly, that if crude copper phthalocyanine is ground with a small amount of crystallising solvent in the absence of inorganic salts but in the presence of one or more sulphonated phthalocyanine amine derivatives, as hereinafter defined, the resulting pigment composition is freely dischargeable from the mill in high yield and is, moreover largely in the β form and therefore may be directly incorporated into application media such as inks and paints. It is a feature of the invention that the sulphonated phthalocyanine amine derivative remains in the pigment composition and enhances the rheological and colouristic performance of the pigment composition in application media. These findings are more surprising because a simple physical mixture of similar proportions of separately ground copper phthalocyanine pigment and sulphonated phthalocyanine amine derivative does not optimise the application properties.

By crystallising solvent in this invention we mean those solvents which readily convert α-form copper phthalocyanine into β-form copper phthalocyanine. Especially significant crystallising solvents are aryl and aralkyl hydrocarbons, aromatic amines such as aniline and its N-alkyl derivatives, and chlorinated hydrocarbons such as tetrachloroethylene.

According to the present invention there is provided a process for conditioning pigments which comprises grinding a crude copper phthalocyanine pigment and a crystallising solvent in the absence of inorganic salt but in the presence of one or more sulphonated phthalocyanine amine derivatives having the general formula I

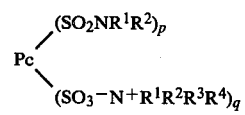    I wherein Pc represents a metal or metal free phthalocyanine, $R^1$, $R^3$ and $R^4$ are the same or different and may each be hydrogen, or a residue containing 1 to 22 carbon atoms, and $R^2$ is a residue containing 1 to 22 carbon atoms, with the proviso that the total number of carbon atoms in the sum of $R^1$, $R^2$, $R^3$ and $R^4$ is not greater than 66, p is 0 to 3, q is 1 to 4 and the sum of p and q is 1 to 4.

Derivatives of formula I are preferred where p is 0 to 3 and q is 1 to 2.5.

The derivatives of formula I may be formed by reacting one or more sulphonated phthalocyanine dyestuffs of the formula:

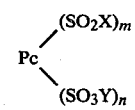    II wherein X is halogen, preferably chlorine, Y is hydrogen or alkali metal, m is 0–3, n is 1–4 and the sum of m and n is 1–4 with a sufficient quantity of one or more amines chosen from the group consisting of $C_{1-66}$ primary, secondary and tertiary amines and quaternary ammonium salts, to substantially neutralise the sulphonic acid groups and, for primary and secondary amines only, react with the sulphonyl halide groups if present.

In the dyestuff of formula II, m and n may be identical to p and q in the derivative of formula I but they may differ as the method of preparation of the derivative of formula I could lead to some hydrolysis of sulphonyl halide which would result in p<m and q>n.

The crystallising solvents are e.g. aryl and aralkyl hydrocarbons such as toluene, xylene, cumene, mesitylene, octyl benzene, dodecylbenzene, aromaic amines such as aniline, N,N-dimethyl aniline, N,N-diethyl aniline and chlorinated hydrocarbons such as tetrachloroethylene.

The amount of crystallising solvent may conveniently be up to 3% by weight, and preferably from 1 to 2.5%. The optimum amount is that which produces a full discharge yield from the grinding mill with a β-form content of greater than 90%.

Preferred amines which are reacted with the sulphonated phthalocyanine amine dyestuff are those which as well as giving easy discharge from grinding, optimise the application properties. Examples are $C_1$-$C_{22}$ cyclic or a cyclic alkyl, aryl, or aralkyl primary amines, or dehydroabietylamine, the alkyl, aryl or aralkyl groups, being optionally substituted by one or more hydroxyl groups; tertiary amines of the formula III:

or quaternary ammonium salts having the formula

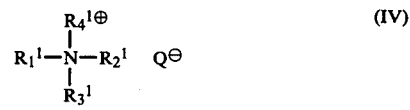

wherein $R_1^1$, $R_2^1$, $R_3^1$ and $R_4^1$ each represent an alkyl, alkenyl or alkapolyenyl group, the total number of carbon atoms in the tertiary amine or quaternary ammonium salt being from 20-60, and at least one and more preferably two of the groups $R_1^1$, $R_2^1$, $R_3^1$ and $R_4^1$ has a backbone of at least 12 consecutive carbon atoms. The anionic species $Q^\ominus$ is preferably halide, acetate or hydroxide.

The selected amines may be based on specific alkyl, alkenyl or alkapolyenyl amines but are more conveniently derived from the mixture of hydrocarbon residues of naturally occurring oils and fats such as coconut oil, tallow, corn oil, fish oil or whale oil or alternatively wood rosin.

The amount of sulphonated phthalocyanine amine derivative used in the grinding may conveniently be from 1% to 15% and preferably from 6% to 12% by weight based on the total weight of crude phthalocyanine and the derivative.

The grinding time is usually from 2 to 16 hours, preferably from 3 to 6 hours.

The phthalocyanine dyestuff of formula II may be metal free, or it may be a zinc, copper, cobalt, nickel or other transition metal phthalocyanine and may contain halogen, especially chlorine, in the phthalocyanine molecule. Copper phthalocyanine dyestuffs are preferred.

This phthalocyanine dyestuff may be prepared by any of the methods in common use; for example by reacting the phthalocyanine with chlorosulphonic acid or oleum at elevated temperature for several hours, then drowning out into an aqueous solution of sodium chloride prior to recovery as a presscake by filtration.

The sulphonated phthalocyanine amine derivatives of formula I may be prepared in aqueous solution, except where the amine is incapable of forming a solution in aqueous mineral or organic acids. Alternatively, they may be prepared in a suitable solvent and recovered by precipitation, e.g. with water, or by removal of the solvent by distillation, optionally with the addition of water. Such preparation in solvent is particularly useful for amines which do not readily form solutions in aqueous acids. Among suitable solvents there may be mentioned acetone, ethylmethylketone, ethanol and methanol, but isopropanol is particularly preferred. Phthalocyanine mixed sulphonic acid/sulphonyl halides of formula II are readily reacted with amine in solvent, optionally in the presence of a weak base such as sodium carbonate.

Although the pigment compositions when prepared by the process of the present invention may be incorporated directly in application media, they may, if desired, be subjected to further treatments before incorporation, for example, (a) aqueous acid washing to remove iron contamination resulting from breakdown of the steel grinding media. This will also remove crystallising solvents of the aromatic amine type and acid soluble impurities.

(b) rosination by any of the known aqueous or solvent methods.

The pigment compositions when prepared by the process of this invention are particularly suitable for incorporation into oil ink and paint application media.

The invention is illustrated by the following Examples 1 to 23 in which parts and percentages are expressed by weight.

EXAMPLE 1

20 parts of the compound of formula $CuPc(SO_3H)_n$—in which CuPc represents copper phthalocyanine and n is 2, in presscake form, were stirred in 200 parts of isopropanol and the temperature raised to reflux. 29.2 parts of the amine of formula III, where $R_1$ is a methyl group and $R_2$, $R_3$ are hydrogenated tallow residues, were dissolved in 200 parts hot isopropanol, and added over 5 minutes. After a further 30 minutes at reflux, 400 parts of water were added over 60 minutes, and the isopropanol simultaneously distilled off at the same rate. Stirring was stopped and the blue-green product of the reaction was isolated by filtration from clear liquors, washed with warm water, and dried at 60° C. to give a yield of 48.1 parts.

10 parts of this compound of the formula V:

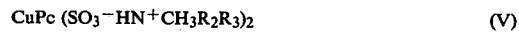

were charged to a 1-liter steel mill containing 2600 parts of steel grinding media, 2 parts of diethyl aniline (D.E.A.) and 90 parts of crude copper phthalocyanine recovered from the reaction of phthalic anhydride, urea, cupric chloride and molybdic oxide catalyst in nitrobenzene solvent.

The mill was sealed and agitated for four hours on a Tema $^R$ laboratory vibratory mill. The mill contents were discharged onto a 60 mesh sieve to yield 100 parts of soft-textured blue powder pigment composition. The proportion of the α-modification of copper phthalocyanine present in the composition was assessed by X-ray diffraction measurements.

A phenolic-toluene publication gravure ink was prepared from the composition by weighing into a ball mill the following:

| | |
|---|---|
| Phenolic varnish (a 50/50 w/w mixture of Alsynol$^R$ RB30 phenolic resin in toluene) | 48 parts |
| Toluene | 40 parts |
| Pigment composition | 12 parts |
| Steatite balls (100 mm dia.) | 250 parts | stirring briefly after each addition. The mill was sealed and the contents milled at room temperature for 16 hrs. The mill discharge was assessed initially without agitation, until the onset of dripping. Thereafter the mill was agitated until no more millbase emerged (final yield). The viscosity of the millbase was measured by noting the time taken to pass through a No. 3 Zahn Cup, and the fineness of grind (F.O.G.) assessed on a Hegman gauge.

A 6% pigmentation ink was prepared from the millbase by successively stirring into a glass bottle 36 parts of phenolic varnish, 14 parts of toluene, and 50 parts of mill base. The ink was shaken well, then drawn-down on coated paper, using a No. 0 K-bar. In this way the inks prepared from other products of the process of this invention could be compared in strength and shade. These application test results are contained in Table 1.

Substantially similar strength and flow results are obtained if the ground product of this Example is acid washed by the procedure described for Examples 2-6 prior to incorporation in the application medium. There is, however, a noticeable increase in the cleanliness of the ink film.

COMPARATIVE EXAMPLE IA

The method of Example 1 is repeated but in the absence of the compound of formula V. The application test results are shown in Table I and it is clear that inferior mill yields and application properties are obtained in the absence of a dyestuff-amine derivative of copper phthalocyanine in the grinding operation.

EXAMPLES 2-6

The method of Example 1 was repeated with the use of 2.5,5, 12.5,15 and 20 parts respectively of the dyestuff-amine composition. In each case the proportion of crude copper phthalocyanine was adjusted to give a total charge of 102 parts.

Each ground pigment composition was slurried in 500 parts water containing 25 parts concentrated hydrochloric acid. After stirring the mixture for 1 hr. at 90° C., the purified material was recovered by filtration, washed to neutral pH with hot water, and dried at 50°-60° C. Phenolic-toluene inks were prepared by the method of Example 1.

The effects of additive concentration on mill yield and application properties are shown in Table I, which demonstrates that the optimum mill yield and application performance is obtained from the composition containing 10% of the additive of formula V (Example 1).

Substantially similar strength and flow results are obtained if the acid washing purification stage is omitted, though cleanliness of the ink film is reduced.

EXAMPLES 7 AND 8

The method of Example 1 was repeated with the use of 1 part and 3 parts of D.E.A. respectively giving total charges of 101 and 103 parts. The effect of this variation of crystallising solvent on mill yield and application properties is shown in Table I, where it can be seen that optimum mill yield combined with good application properties are obtained by the use of 2 parts D.E.A. (Example I).

EXAMPLES 9-12

91 parts of crude copper phthalocyanine, 2 parts of D.E.A. and 9 parts of the compound of formula $CuPc(SO_3^-.H_3N^+C_{20}H_{29})_m(SO_2NHC_{20}H_{29})_n$ (VI) where $C_{20}H_{29}$ represents a dehydroabietyl residue and $m+n=2.5$, and n is approximately 1, the preparation of which is described below were ground for 4,6, 8 and 10 hours respectively and acid washed by the method described for Examples. 2-6. The mill yield and applications properties are given in Table II, which shows that no substantial advantage is gained by grinding for an extended period.

The compound of the formula (VI) was prepared by treating crude CuPc with chlorosulphonic acid at 110°-113° C. for 5½ hours, and subsequently drowning out into an ice/salt/water mixture. The filtered, washed presscake was reslurried in more ice/salt/water, the pH adjusted to 5.0 and Rosin Amine D acetate solution added dropwise. After 1 hour at 80°-85° C. sufficient HCl was added to give no blue bleed, and the slurry filtered, washed salt-free and dried at 60° C.

EXAMPLES 13-21

Crude copper phthalocyanine, crystallising solvent, and additives defined in Table III, were ground by the method of Example 1 in the proportions and under the conditions described in Table IV. The properties of phenolic-toluene inks derived from these pigment compositions by the method of Example 1 are also given in Table IV thus illustrating the range of additive types suitable for the operation of the invention.

EXAMPLE 22

92 parts of crude copper phthalocyanine, 2 parts of trichloroethylene and 8 parts of the compound of formula (XIII)

$$CuPc(SO_3^-H_3N^+R)_m(SO_2NHR)_n \qquad (XIII)$$

where R is a mixture of branch chained $C_{20\text{-}22}$ hydrocarbons, $m+n=2.5$ and n is approximately 1, the preparation of which is described below were ground for 4 hours. The pigment composition recovered from the mill in a yield of 91% was acid washed by the method described for Examples 2-6. The phenolic-toluene publication gravure millbase prepared from the product of this example by the method of Example 1, discharged a final yield of 92% from the mill in 11 seconds. The 6% pigmentation ink derived from this millbase was 15-20% stronger, slightly greener and with very superior gloss when compared with a corresponding ink derived from a salt ground, solvent treated β-copper phthalocyanine pigment.

Preparation of the compound of the formula XIII 98 parts of crude copper phthalocyanine and 750 parts chlorosulphonic acid were stirred for 30 mins. at room temperature, then heated to 110°-113° C. and maintained at this temperature for 5½ hrs. The reaction products were poured into an agitated mixture of 800 parts water, 2000 parts ice and 180 parts sodium chloride, at such a rate that the temperature did not rise above 10° C. The resulting slurry was filtered and washed with a solution of 460 parts sodium chloride in 3600 parts cold water. The presscake was resuspended in 800 parts water containing 40 parts sodium chloride and a 0.5 M. Primene JM-T acetate solution, (prepared by heating together 116 parts Primene CM-T, 700 parts water and 23 parts glacial acetic acid), added evenly over 30 mins. The pH was raised to 8.5 with dilute sodium hydroxide solution and the mixture stirred for 1 hr. at 85° C. Sufficient concentrated hydrochloric acid was then added to clear any blue bleed, and the product filtered, washed salt free with water, and dried at 50°-60° C., to yield 234 parts of a blue-green powder.

resulting pigment composition were similar to those of Example 22.

TABLE I

| Ex. NO. | DES- CRIPTION | ACID WASH | YIELD | % α-Form | PHENOLIC TOLUENE PUBLICATION GRAVURE INK ||||
|---|---|---|---|---|---|---|---|---|
| | | | | | MILL BASE ||| FINAL INK STRENGTH |
| | | | | | DISCHARGE | FLOW(No.3 ZAHN CUP) | F.O.G. | |
| 1 | 90 pts Crude CuPc 10 pts V 2pts D.E.A. | NO | 100pts | 8 | DRIP-88pts, 50s FINAL-88pts | 20s | 8:7.5:7 | 10% strong V/SL Green and clean |
| 1A | 100pts Crude CuPc 2 pts D.E.A. | NO | 85pts | 5 | DRIP-36pts, 30s FINAL-85pts | TOO THIXOTROPIC | 8:7:5 | CONTROL |
| 2 | 97.5pts Crude CuPc 2.5 pts V 2pts D.E.A. | YES | 83pts | 6 | DRIP-74pts, 35s FINAL-87pts | 18s | 8:8:7 | 5% STRONG, CLEAN SIMILAR SHADE |
| 3 | 95 pts Crude CuPc 5pts V 2pts D.E.A. | YES | 95pts | 6 | DRIP-30pts, 17s FINAL-84pts | TOO THIXOTROPIC | 8:7:7 | 5-10% STRONG CLEAN |
| 4 | 87.5pts Crude CuPc 12.5pts V 2pts D.E.A. | YES | 83pts | 9 | DRIP-84pts, 30s FINAL-84pts | 18s | 8:8:7 | 15% STRONG CLEAN |
| 5 | 85pts Crude CuPc 15pts V 2pts D.E.A. | YES | 64pts | 12 | DRIP-89pts, 27s FINAL-89pts | 12s | 8:8:7 | 15% STRONG, CLEAN SLIGHTLY GREEN |
| 6 | 80pts Crude CuPc 20pts V 2pts D.E.A. | YES | 21pts | 45 | DRIP-80pts, 40s FINAL-88pts | 25s | 8:7:7 | 15% STRONG, CLEAN SLIGHTLY GREEN |
| 7 | 90pts Crude CuPc 10pts V 1pt D.E.A. | YES | 90pts | 10 | DRIP-72pts, 35s FINAL-81pts | 20s | 8:8:7 | 10-15% STRONG CLEAN |
| 8 | 90pts Crude 10pts V 3pts D.E.A. | YES | 53pts | 6 | DRIP-26pts, 35s FINAL-84pts | TOO THIXOTROPIC | 8:8:7 | 10-15% STRONG SL.GREEN, CLEAN |

TABLE II

| EXAMPLE NO. | DESCRIPTION | Grinding Time (hrs) | YIELD (PTS) | % α-form | PHENOLIC/TOLUENE PUBLICATION GRAVURE INK ||||
|---|---|---|---|---|---|---|---|---|
| | | | | | MILL BASE ||| FINAL INK STRENGTH vs Example A |
| | | | | | DISCHARGED | FLOW | F.O.G. | |
| 9 | 91pts Crude CuPc 9pts VI 2pts D.E.A. | 4 | 95 | 54 | DRIP-22pts, 30s FINAL-83pts | TOO THIXOTROPIC | 8:7:7 | 20% STRONG V/SL GREEN CLEAN |
| 10 | 91pts Crude CuPc 9pts VI 2pts D.E.A. | 6 | 96.5 | 54 | DRIP-13pts, 12s FINAL-85pts | TOO THIXOTROPIC | 8:7:7 | 15-20% STRONG v/SL GREEN CLEAN |
| 11 | 91pts Crude CuPc 9pst VI 2pts D.E.A. | 8 | 98.5 | 75 | DRIP-19pts, 15s FINAL-85pts | TOO THIXOTROPIC | 8:7:7 | 15% STRONG, CLEAN v/SL GREEN |
| 12 | 91pts Crude CuPc 9pts VI 2pts D.E.A. | 10 | 96 | 90 | DRIP-14pts, 13s FINAL-87pts | TOO THIXOTROPIC | 8:7:7 | 10% STRONG, CLEAN v/SL GREEN |

EXAMPLE 23

An additive was prepared by the method described for additives VI and XIII, using as amine p-cetyloxy aniline, to give a compound of formula

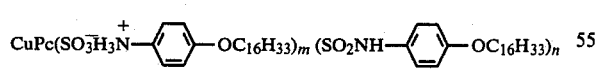

$CuPc(SO_3^-H_3N$—⟨ ⟩—$OC_{16}H_{33})_m(SO_2NH$—⟨ ⟩—$OC_{16}H_{33})_n$ where m and n have their previous significance.

11 parts of this compounds, 2 parts of D.E.A. and 89 parts of crude copper phthalocyanine were ground for 4 hrs. The mill yield and application properties of the

TABLE III

The following additives were prepared analogously to the methods hereinbefore described and were employed in the experiments according to Examples 13 to 21.

| Type of Additive | FORMULA OR STRUCTURE |
|---|---|
| VII | $CuPc(SO_3^-CH_3^+NH(C_{12}H_{25})_2)_2$ |
| VIII | $CuPc(SO_3^-CH_3^+NHR_2)_2$ |
| | R = eicosanyl of docosanyl residue |
| IX | $CuPc(SO_3^-(CH_3)^+NHR)_2$ |
| | R = soya oil hydrocarbon chain residue |
| X | $CuPc(SO_3^-.H_3-^+NR)_2$ |
| | R = $C_{18}-C_{22}$ tertiary alkyl residue |
| XI | $CuPc(SO_3^-H_3^+NR)_2$ |
| | R = eicosanyl or docosanyl residue |
| XII | $CuPc(SO_3^-.H_2^+N(C_{18}H_{18}H_{37})_2)_2$ |

TABLE IV

| EXAMPLE | Crude CuPc (PARTS) | TYPE OF ADDITIVE | ADDITIVE (PARTS) | TYPE OF CRYST. SOLVENT | CRYST. SOLVENT (PARTS) | GRIND TIME (HOURS) | YIELD (PARTS) | ACID WASH |
|---|---|---|---|---|---|---|---|---|
| 13 | 88 | X | 12 | D.E.A. | 2 | 4 | 96 | YES |
| 14 | 90 | V | 10 | DODECYL | 1 | 4 | 100 | YES |

TABLE IV-continued

| | | | | | | | | |
|---|---|---|---|---|---|---|---|---|
| 15 | 90 | V | 10 | BENZENE DODECYL BENZENE | 2 | 4 | 93 | YES |
| 16 | 90 | V | 10 | DODECYL BENZENE | 3 | 4 | 82 | YES |
| 17 | 90 | VII | 10 | D.E.A. | 1.5 | 4 | 100 | NO |
| 18 | 93 | VIII | 7 | D.E.A. | 1.5 | 5 | 95 | NO |
| 19 | 95 | IX | 5 | D.E.A. | 2 | 4 | 79 | NO |
| 20 | 88 | XI | 12 | D.E.A. | 2 | 6 | 85 | NO |
| 21 | 85 | XII | 15 | D.E.A. | 2.5 | 3 | 87 | NO |

PHENOLIC/TOLUENE PUBLICATION GRAVURE INK

| EXAMPLE | MILL BASE DISCHARGE | MILL BASE FLOW | F.O.G. | FINAL INK STRENGTH Vs Example A |
|---|---|---|---|---|
| 13 | DRIP-25pts, 45s FINAL-86pts | TOO THIXOTROPIC | 6:7:7 | 15% STRONG, MOD. GREEN CLEAN |
| 14 | DRIP-86pts, 40s FINAL 86pts | 21s | 8:8:7 | 10-15% STRONG SL. CLEAN |
| 15 | DRIP-84pts, 30s FINAL 84pts | 19s | 8:8:7 | 10-15% STRONG SL. CLEAN |
| 16 | DRIP-68pts, 40s FINAL-88pts | 25s | 8:8:7 | 0-5% STRONG SL. CLEAN |
| 17 | DRIP-91pts, 14s FINAL-9pts | 9s | 8:8:7 | 10-15% STRONG EQUAL CLEANLINESS |
| 18 | DRIP-11pts, 10s FINAL-86 pts | TOO THIXOTROPIC | 8:8:7 | 10-15% STRONG SL. CLEAN |
| 19 | DRIP-56pts, 36s FINAL-89pts | 25s | 8:8:7 | 5% STRONG V.SL. GREEN |
| 20 | DRIP-92pts, 13s FINAL-98pts | 9s | 8:8:7 | 10-15% STRONG EQUAL CLEANLINESS |
| 21 | DRIP-90pts, 22s FINAL-90pts | 10s | 8:8:7 | 5% STRONG |

What is claimed is:

1. A process for conditioning pigments which comprises grinding a crude copper phthalocyanine pigment and a crystallizing solvent, capable of converting alpha-form copper phthalocyanine into the beta-form thereof, in the absence of inorganic salt but in the presence of one or more sulphonated phthalocyanine amine derivatives having the general formula

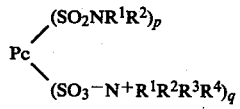

wherein Pc represents a metal or metal free phthalocyanine; $R^1$, $R^3$ and $R^4$ are the same or different and are hydrogen or a residue containing 1 to 22 carbon atoms; $R^2$ is a residue containing 1 to 22 carbon atoms;
with the proviso that the total number of carbon atoms in the sum of $R^1$, $R^2$, $R^3$ and $R^4$ is not greater than 66; p is 0 to 3, q is 1 to 4 and the sum of p and q is 1 to 4.

2. A process as claimed in claim 1 wherein the amine moiety or moieties in the compound of the formula X are selected from $C_1$-$C_{22}$ cyclic or acyclic alkyl, aryl, or aralkyl primary amines, or dehydroabietylamine, the alkyl, aryl or aralkyl groups, being optionally substituted by one or more hydroxyl groups; tertiary amines of the formula III:

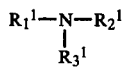

or quaternary ammonium salts having the formula

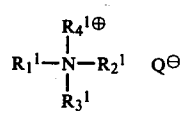

wherein $R_1^1$, $R_2^1$, $R_3^1$ and $R_4^1$ each represent an alkyl, alkenyl or alkapolyenyl group, the total number of carbon atoms in the tertiary amine or quaternary ammonium salt being from 20–60, and at least one and more preferably two of the groups $R_1^1$, $R_2^1$, $R_3^1$ and $R_4^1$ has a backbone of at least 12 consecutive carbon atoms.

3. A process as claimed in claim 2 wherein in the formula IV $Q^\ominus$ represents a halide, acetate or hydroxide.

4. A process as claimed in claim 2 wherein the said amine moiety or moieties are derived from naturally occurring oils, fats or wood rosin.

5. A process as claimed in claim 1 wherein q is 1 to 2.5.

6. A process as claimed in claim 1 wherein the crystallising solvent is selected from aryl and aralkyl hydrocarbons such as toluene, xylene, cumene, mesitylene, octyl benzene, dodecylbenzene, aromatic amines such as aniline, N,N-dimethyl aniline, N,N-diethyl aniline and chlorinated hydrocarbons such as tetrachloroethylene.

7. A process as claimed in claim 6 wherein the amount of crystallizing solvent present is between 1 to 2.5% by weight with respect to the sum of the crude phthalocyanine and phthalocyanine derivative components.

8. A process as claimed in claim 1 wherein the amount of aminated phthalocyanine sulphonic acid of the formula I is between 2 and 15% by weight based on the total weight of crude copper phthalocyanine and copper phthalocyanine derivative.

9. A process as claimed in claim 8 wherein the amount of said copper phthalocyanine derivative present is between 6 and 12%.

10. A process as claimed in claim 1 wherein the phthalocyanine moiety of the compound of the formula I is metal free or is a metal phthalocyanine.